April 28, 1925.

B. ASHER

OIL STRAINER

Filed Jan. 23, 1924

1,535,801

Witness
Lynn Latta

Inventor
Blaine Asher
By Bair & Freeman
Attys

Patented Apr. 28, 1925.

1,535,801

UNITED STATES PATENT OFFICE.

BLAINE ASHER, OF SPENCER, IOWA.

OIL STRAINER.

Application filed January 23, 1924. Serial No. 687,946.

*To all whom it may concern:*

Be it known that I, BLAINE ASHER, a citizen of the United States, and a resident of Spencer, in the county of Clay and State of Iowa, have invented a certain new and useful Oil Strainer, of which the following is a specification.

The object of my invention is to provide an oil strainer of simple, durable and inexpensive construction.

More particularly, it is my object to provide an oil strainer for use with engines of motor vehicles which are subject to certain conditions where such a strainer is desirable.

A further object is to provide such an oil strainer particularly adapted for use in the oiling system of an internal combustion engine, comprising a tubular foraminous strainer member having a short upwardly extending tube connecting with its end opposite its discharge end.

Figure 1:
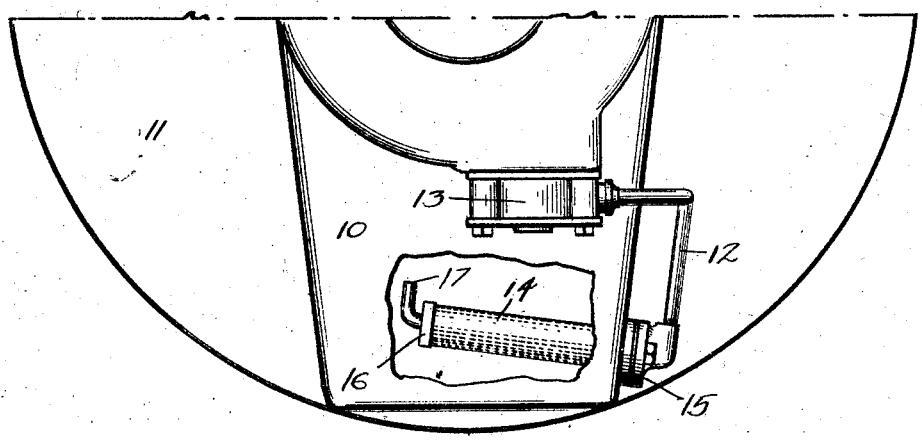
Figure 2:
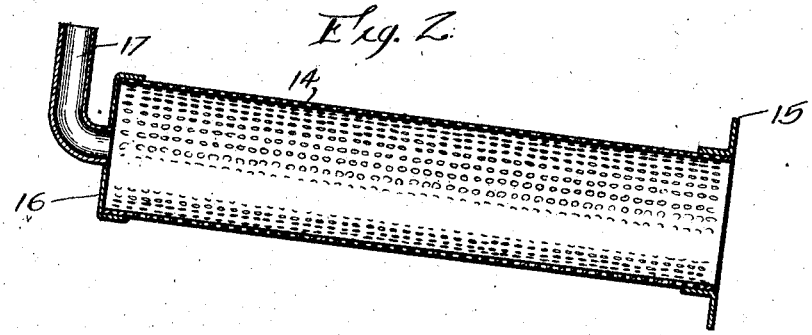

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a front elevation of a portion of a crank case equipped with an oil strainer embodying my invention, the parts of the crank case being broken away to show the oil strainer installed thereon; and Figure 2 shows a vertical, longitudinal, sectional view through a strainer embodying my invention.

In the accompanying drawings, I have shown in Figure 1 a crank case of the general type employed in the Dodge automobile indicated by the reference character 10 and arranged in front of a fly-wheel casing.

At the bottom of the crank case is an outlet pipe 12 leading to the oil pump 13.

It is the custom in cars of this type to draw the oil from the lower part of the crank case into the oil pipe 12 through a strainer, which prevents the drawing of chunks or solid matter into the pump and strains the dirt and foreign material out of the oil before the oil is distributed to the moving parts of the engine.

This strainer consists of a foraminous tube 14, having at one end an annular flange 15 connected with a pipe or tube 12. The other end of the strainer tube is provided with an end member 16, which may be foraminous, perforated or otherwise.

The oil from the very bottom of the crank case is drawn through the strainer 14 and the pipe 12 to the pump and is thence distributed to the various bearings and moving parts.

Considerable trouble is experienced with this strainer structure in sections of the country where the temperature becomes quite low in the wintertime, because of the tendency of the perforated or foraminous strainer member 14 to freeze over or become covered by hard oil. In very cold weather, any water which might happen to be in the oil will, of course, be at the bottom of the crank case and close to the strainer 14. This water is likely to freeze around the strainer or to contribute to the freezing of the oil around the strainer.

More common difficulty arises from the tendency of the oil itself to become stiff and hard immediately around the strainer. The oil sometimes freezes quite hard in a coating around the member 14.

With the structure heretofore employed, it is found that the section from the pump in cold weather will frequently fail to remove this coating of hard grease from around the strainer, and as result, the parts of the engine are not properly lubricated and the bearings burn out in an extremely short time. The coating of hard oil around the strainer can not be sucked through the small openings when that coating is quite hard.

In order to obviate this difficulty, I have therefore provided at the end of the strainer 14 opposite its discharge end a tubular member 17 communicating with the interior of the strainer through the end 16 and inclined thence upwardly to a point slightly above the upper end of the strainer, as shown in Figure 2.

In actual use in the car mentioned, the strainer is inclined downwardly toward its discharge end, as shown in the drawings.

I find that where this tubular member 17 is employed, its upper end projects into the softer part of the oil, but that even if the oil has become quite hard, yet when the member 14 is coated over with a coating that could not be sucked through the small perforations of the strainer by the suction from the pump, that suction is strong enough to draw oil through the tubular member 17 and thence through the strainer 14 and pipe 12.

It is, of course, obvious that after the engine has been operated a very short time, it becomes heated, the oil is warmed and the oil will be thinned by the heat and the coating around the strainer 14 will disappear thereby allowing the warmed oil to readily pass through the perforations of the strainer 14. Due to the fact that the pump 13 draws oil from the lower end of the strainer 14, it will cause its greatest suction at that point and the farther any given point is from said lower end the less will be the suction.

The operation of my improved oil strainer has been watched in the form of careful experiments under a great variety of conditions.

The oil used as engine oil rarely gets so hard, and in fact I have never seen it so hard that it can not be drawn through the pipe 17. On the other hand, it frequently becomes hard enough, so that it can not be drawn through the perforations in the wall of the strainer 14.

A device of this kind therefore is of special value in cold weather when its use may at any time save the driver of the car from the danger of burning out the engine bearings.

I claim as my invention:

1. An oil strainer comprising a foraminous tube open at one end and having an end member at its other end, an upwardly extending tube communicating with the interior of said strainer through the latter end, whereby the oil from the oil container is permitted to pass when said oil is too cold to be drawn through said foraminous tube.

2. An oil strainer comprising a foraminous tube having an open end adapted to be connected with an oil pipe, said tube being inclined slightly downwardly toward its open end, said tube having an end member at its other end, and a substantially smaller tube connecting with the interior of said foraminous strainer tube through said latter-described end member and projecting upwardly therefrom for the purposes stated.

Des Moines, Iowa, January 12, 1924.

BLAINE ASHER.